N. C. Fowler,
Artificial Teeth
N° 46,345. Patented Feb. 14, 1865.

Witnesses:
J. P. Hale
H. E. Fisher

Inventor:
Nathaniel C. Fowler
by his attorney
R. H. Eddy

UNITED STATES PATENT OFFICE.

NATHANIEL C. FOWLER, OF YARMOUTH PORT, MASSACHUSETTS.

IMPROVEMENT IN ARTIFICIAL TEETH.

Specification forming part of Letters Patent No. 46,345, dated February 14, 1865.

*To all whom it may concern:*

Be it known that I, NATHANIEL C. FOWLER, of Yarmouth Port, in the county of Barnstable and State of Massachusetts, have made a new and useful invention having reference to the Manufacture of Sets of Artificial Teeth; and I do hereby declare the same to be fully described in the following specification and represented in the accompanying drawings, of which—

Figure 1:
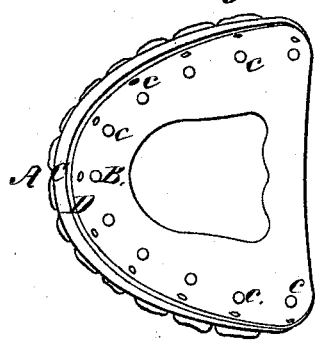
Figure 2:
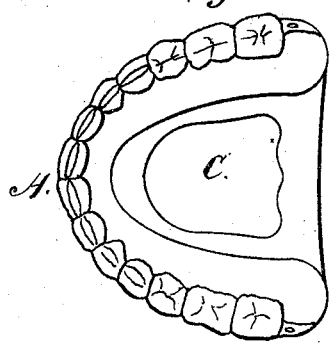
Figure 3:
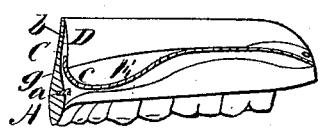

Figure 1 denotes a top view, Fig. 2 a bottom view, and Fig. 3 a vertical section, of a set of artificial teeth made in accordance with my improvement.

In carrying out my invention the several mineral teeth or blocks of teeth are united to aluminium plates by means of hard vulcanized india-rubber—or, in other words, a compound of caoutchouc and sulphur, heated and treated in a manner well known, so as to produce what is generally termed "hard rubber" or "vulcanite."

In the common process of mounting teeth in sets with hard rubber and a metallic suction-plate the rubber composition has been arranged on opposite sides of each tooth while abutting against the plate. In this case the gum or flesh of the jaw, while the set of teeth was in place in the mouth of a person, came in contact with the surface of the plate only. In my improvement the india-rubber composition forms a part of the bearing for the gum, and holds the plates in place by extending into countersunk or tapering holes made in them.

In the drawings, A denotes the block of teeth; B, the inner metallic plate; C, an external plate capping the artificial gums $g$ of the teeth or extending from them in manner as represented.

D is the vulcanite or vulcanized india-rubber composition, which is arranged back of the teeth and plate C, and between the teeth and the trough of the plate B. The composition D holds the teeth in place by means of dowels or pins $a$, extending from them and into it.

Each of the plates B C is made or provided with a series of countersunk or tapering holes, $b\ c\ c$, having their lesser diameters arranged next the inner surfaces of each plate, or next to the mass of rubber composition, which, on being pressed into such holes, so as to fill them, will, when hardened by the process of vulcanizing, serve like rivets to hold the plates in connection with the teeth.

The extra plate C not only serves to conceal the composition from view, but to strengthen the upper portions of it, and prevent it from becoming broken or cracked. By the employment of the guard-plate C, and by terminating the plate B in rear of the teeth, in the manner as represented in Fig. 3, we are enabled to make very thin that portion of the set which is to come in front of the gum or between the gum and the lip of the wearer of the set—a matter of great importance in preventing undue prominence of the lip.

The construction of each of the teeth-plates, with tapering holes in them for the purpose of connecting the composition to them is new in the manufacture of them, and, besides, is very useful, particularly when the plates are made of aluminium, to which pins or projections cannot be soldered.

My invention has resulted from a desire on my part to find some efficient means of manufacturing sets of artificial teeth with aluminium plates as a substitute for gold plates, the aluminium being much lighter than gold and not liable to corrosion. By arranging and applying the teeth, the vulcanite, and the plates, and making the latter in the manner as hereinbefore described, I have been able to accomplish the desired result, and to produce sets of teeth at much less expense than they can be made with the gold plate or plates. The vulcanite composition before being vulcanized is applied to the plates and teeth, a matrix or mold being used to hold the parts in their respective places, as well as to give the proper form to such surface of the vulcanite, which may be intended to bear against the gum. In this state the set of teeth is to be subjected to the heating process, whereby the vulcanite composition becomes hardened.

I claim—

1. The combination, as well as the arrangement, of the metallic guard-plate C, the vulcanite D, and the metallic inner plate, B, applied to artificial teeth, substantially as specified.

2. The combination of the series of tapering holes $b$ or $c$, with the aluminium plate in which they are formed, the vulcanite, and the artificial teeth, substantially as specified.

3. As an improved manufacture, a set of any suitable number of artificial teeth, and one or more aluminium plates combined by means of a composition, as hereinabove described, or its equivalent.

NATHL. C. FOWLER.

Witnesses:
R. H. EDDY,
F. P. HALE, Jr.